United States Patent [19]

Fallwell

[11] 3,755,233
[45] Aug. 28, 1973

[54] COMPOSITION COMPRISING ETHYLENE/VINYL CHLORIDE/N-METHYLOL ACRYLAMIDE AND A MINERAL PIGMENT FOR COATING PAPER

[75] Inventor: William F. Fallwell, St. Louis, Mo.

[73] Assignee: Monsanto Company, St. Louis, Mo.

[22] Filed: July 20, 1970

[21] Appl. No.: 56,685

[52] U.S. Cl. 260/29.6 TA, 117/155 UA, 117/161 UT, 260/17.3, 260/17.4 ST, 260/41 B, 260/80.73
[51] Int. Cl. C08f 37/14, C08f 45/06
[58] Field of Search .............. 260/29.6 TA, 80.73, 260/41, 55, 613

[56] References Cited
UNITED STATES PATENTS

| 3,428,582 | 2/1969 | Deex | 260/8 |
| 3,458,487 | 7/1969 | Mortimer | 260/80.73 |
| 3,459,698 | 8/1969 | Mantell et al. | 260/29.4 |
| 3,567,491 | 3/1971 | Graham et al. | 117/76 |

Primary Examiner—William H. Short
Assistant Examiner—L. M. Phynes
Attorney—J. E. Maurer, N. E. Willis and E. P. Grattan

[57] ABSTRACT

Composition comprising an aqueous dispersion of ethylene/vinyl chloride/N-methylol acrylamide and a mineral pigment useful for coating cellulosic substrates such as paper and paperboard.

9 Claims, No Drawings

COMPOSITION COMPRISING ETHYLENE/VINYL CHLORIDE/N-METHYLOL ACRYLAMIDE AND A MINERAL PIGMENT FOR COATING PAPER

This invention relates to coated cellulosic substrates and to coating compositions useful in the preparation of such coated cellulosic substrates.

The term "E/VCl/NMA terpolymer" as used herein means ethylene/vinyl chloride/N-methylol acrylamide terpolymer.

The term "pick resistance" as used herein means the ability of a pigment coating composition to resist the pull of tacky printing inks and remain adhered to the cellulosic substrate.

In the preparation of coated cellulosic substrates, for example, paper or paperboard, there is used a pigment such as clay or the like and in many cases additional materials such as a soluble pyrophosphate for dispersing and stabilizing purposes. The pigment or admixtures of pigment with other materials are commonly termed a pigment "slip" or since they usually contain clay, a clay slip. The pigment slip or clay slip is then compounded with a binder or adhesive material to produce a pigment binder composition useful for coating cellulosic substrates, for example, paper or paperboard. Substantial quantities of binder are necessary in many instances, and, accordingly, the composition and characteristics of the binder are of great importance in determining the quality of the finished coated cellulosic substrates. It is important that the binder impart a high degree of brightness, smoothness and gloss to the coated cellulosic substrate as well as a good finish and feel after calendering. The coating composition must also flow smoothly and evenly so that it can be applied to the cellulosic substrates at sufficiently high speeds to economical in ordinary coating processes. It is most important that the coating composition possess high strength in order to permit subsequent printing on the coated paper without "picking," i.e., it must have good "pick resistance." It is primarily the function of the pigment in the coating composition to provide the desirable qualities of the finished coating whereas the adhesive binder provides chiefly the function of binding the pigment to the paper so that the pigment will not be removed by the pull pr printing ink during the inking operation.

It is an object of this invention to provide improved pigment binder coating compositions for cellulosic substrates. It is another object of this invention to provide an improved pigment coated cellulosic substrate. It is a further object to provide a method for coating cellulosic substrates.

In accordance with the present invention, there is provided an aqueous pigment coating composition comprising an E/VCl/NMA terpolymer together with a pigment and optionally the usual paper coating additives which may include minor amounts of other adhesives or binders such as polyvinyl alcohol, casein or starch.

The cellulosic substrates coated with the pigment coating compositions of this invention exhibit excellent gloss and wet rub resistance and are further characterized by improved pick resistance.

The improved pigment coating compositions of the present invention are in the form of aqueous dispersions or emulsions comprising water, a finely divided paper coating mineral pigment and an E/VCl/NMA terpolymer binder. The quantity of pigment in the paper coating compositions can vary from about 20 parts to about 250 parts by weight for each 100 parts by weight of water. Preferred ranges will vary depending upon the specific E/VCl/NMA terpolymer employed, the particular pigment utilized and the desired end use of the finished cellulosic product. A preferred range is from about 50 to about 200 parts by weight of pigment for each 100 parts by weight of water. The amount of E/VCl/NMA terpolymer binder in the coating compositions of this invention will vary from about 1 part to about 100 parts by weight for each 100 part by weight of pigment and preferably from about 10 to about 25 parts by weight of binder for each 100 parts by weight of pigment. The aqueous pigment binder compositions can contain from about 20.2 to about 400 parts by weight of dispersed solids for each 100 parts by weight of water.

The E/VCl/NMA terpolymers useful in this invention contain from about 15 to about 70 weight percent ethylene, 30 to about 85 weight percent vinyl chloride and 0.1 to about 10 weight percent N-methylol acrylamide and the molecular weight as measured by intrinsic viscosity or gel permeation chromatography is generally from about 25,000 to about 150,000.

The E/VCl/NMA terpolymers useful in this invention are readily prepared by which means well known to the art. The interpolymer can be prepared by first mixing ethylene and vinyl chloride in an aqueous medium in the presence of any suitable anionic or nonionic emulsifier and any initiator capable of generating free radicals in the chemical mixture at the chosen reaction temperature and pressure. The N-methylol acrylamide preferably in aqueous solution either alone or mixed with the appropriate amounts of other polar monomers, is added to the polymerizing ethylene and vinyl chloride mixture gradually throughout the reaction. The addition of the N-methylol acrylamide is preferably begun after about 40 to 50 percent of the desired conversion of the ethylene and vinyl chloride has been reached. A shell-core latex in which the polar monomer is concentrated in the outer layers is produced.

The E/VCl/NMA terpolymers used in this invention are preferably prepared by a process which comprises mixing ethylene and vinyl chloride monomers in the presence of an alkaline buffered reduction-oxidation (redox) initiator-catalyst system, water, and from about 1 percent to about 8 percent by weight based upon the monomer feed, or from about 4 percent to about 7 percent based upon the polymer product of an anionic or nonionic emulsifying agent having a hydrophilic-lipophilic balance (HLB) value of from about 10 to about 40, and reaction the mixture at a temperature and pressure and for a time sufficient to cause polymerization between the ethylene and vinyl chloride, and then to introduce N-methylol acrylamide, either alone, or mixed with other monomers in minor amounts in an appropriate diluent such as water into the pressurized polymerizing reaction mixture of the ethylene and vinyl chloride. This process is described in detail in U.S. Pat. No. 3,428,582 and U.S. Pat. No. 3,647,615 entitled "E/VCl/NMA Terpolymer" granted March 7, 1972 in the name of William F. Fallwell and assigned to the assignee of the present invention and the subject matter thereof is expressly incorporated herein by reference.

The following example will illustrate this invention. Parts and percent are by weight unless otherwise indicated.

EXAMPLE 1

About 18 parts of E/VCl/NMA interpolymer on a dry solids basis are added to an aqueous slurry containing 90 parts of coating clay (LUSTRA, Grade No. 1, Freeport Kaolin Company), 10 parts of $TiO_2$ and about 50 parts of water. The total solids content of the resulting pigment coating composition is adjusted by the addition of water to about 45% solids. The pigment coating compositions are applied to one side of paper and cylinder board by means of a No. 20 wire wound drawdown rod at a dry coating weight of about 20 pounds per ream. The coated paper and paper board are dried in an infrared oven at 120° C for about 1 minute, subjected to one nip calendering for smoothness and conditioned at 72° F at 50 percent relative humidity for 1½ hours. The coated paper and paper board are tested for resistance to physical removal of coating during the commercial printing processes by the pick test. Pick resistance, that is, the ability of the coating to resist the pull of printing inks and remain adhered to the particular board is measured by the IGT Printability Test, a widely accepted standard test developed by the Institut voor Graphische Techniek in Amsterdam, Holland. In the IGT test an ink of measured tackiness is applied uniformly to a standard diameter wheel. A strip of board containing the test coating is fastened to a spring loaded cylindrical segment of known diameter. The ink laden wheel is placed against one end of the strip of board at a pressure of 50 kg. The cylinder spring is released and the tacky ink is applied to the strip at an accelerated velocity of from 0 to 630 ft./min. as the strip passes through a given arc. If the coating on the paper is removed ("pick"), a break in the coating will be apparent at some point on the ink printed coated test paper sample. This point is measured using a calibrated scale and reported as the velocity in feet per minute withstood by the coating before failure of the coating. The test is run on samples of the coated board with inks of increasing tackiness until the useful limits of the coated paper sample have been reached. A value of 630 feet per minute represents no failure of the coating with that particular tack graded ink. The next higher number inks are then used in sequence until failure occurs. Results and further details are given in the Table below:

TABLE

| Composition of E/VCl/NMA Interpolymer | IGT Rating, paper No. 4 Ink (ft./min.) | IGT Rating, board No. 6 Ink (ft./min.) |
|---|---|---|
| 21/75/4 | 370 | 418 |
| 20/76/4 | 328 | 372 |

The paper coating mineral pigment is an important component of the coating compositions. The principal functions of the pigment are to fill in the irregularities of the paper surface, to produce an even and uniformly absorbent surface for printing and to improve the appearance of the coated sheet. A suitable pigment should have all or most of the following properties - good dispersiblity in water, correct particle size distribution, high opacifying power, high brightness, low water absorption, nonabrasive qualities, chemical inertness, compatibility with other ingredients of the coating mixture, low adhesive requirements, and if colored, a high tinctorial power and color permanence. Suitable pigment coatings include clays such as kaolinite, illite, montmorillonite, and beidellite; and other materials such as titanium dioxide, kieselguhr, precipitated calcium carbonate, waterground calcium carbonate, calcium sulfate, calcium sulfite, barium sulfate, blanc fixe, stain white, and zinc pigments, e.g., zinc oxide, zinc sulfide, and lithopane.

In order to prepare a satisfactory coating mixture, it is necessary to break up aggregates of dry clay into smaller dispersed particles. This is conventionally achieved by adding water and a dispersing agent to the clay solids and agitating the mixture. Suitable dispersing agents include sodium silicate, sodium tetraphosphate, tetrasodium pyrophosphate, sodium hexametaphosphate, alkali metal salts of aryl alkyl sulfonic acids, and alkaline casein. The quantity of dispersing agent used will vary depending upon the particular compound chosen, the amount of water in proportion to the clay, and the desired effectiveness of the dispersion. From 0.1 to 0.5 percent tetrasodium pyrophosphate based on the weight of clay given an effective dispersion of Georgia kaolinite clay in a 50/50 clay-water slurry. Other concentrations of dispersing agents for other clay slurries can be readily determined. Aqueous clay dispersions can be prepared using heavy-duty mixers such as sigma-blade and dough-type mixers.

The pigment binder of the present invention is an E/VCl/NMA terpolymer and when used alone it is an excellent pigment binder based on performance characteristics of the coated paper. Cost requirements for most applications, however, dictate the inclusion of a less expensive binder along with the E/VCl/NMA terpolymer. Such a dilution, a common practice in the use of synthetic resinous pigment binders, provides a significant reduction in cost with only a slight reduction in properties of the coated paper. Examples of commonly used binders include starches, ethylene oxide-modified starches, casein, alpha-protein and other proteinaceous binders. A binder containing about 50 percent starch, casein or other similar binder and E/VCl/NMA terpolymer solids has been found to provide a satisfactory cost-performance balance for several uses of coated paper. Other ratios of starch of casein solids to E/VCl/NMA terpolymer solids include 95:5, 67:33, 60:40, 40:60, 20:80 and 5:95. The choice of which ratio binder to use will depend upon its properties desired in the final product, the cost of the binder and upon the particular E/VCl/NMA terpolymer latex employed. E/VCl/NMA interpolymer binder can of course be used in combination with other synthetic pigment binders in latex form, examples being styrene/butadiene copolymers, the arcylic and methacrylic polymers, and various polyvinyl acetate materials.

Particularly suitable for use as a pigment binder are E/VCl/NMA terpolymers having from about 20 to 40 by weight polymerized vinyl chloride, from about 60 to 80 weight percent ethylene and from about 1.5 to about 4 weight percent N-methylol acrylamide.

If the binder is to be E/VCl/NMA terpolymer undiluted by starch or casein, the stable E/VCl/NMA terpolymer latex preferably having at least 35 percent solids can be added to the clay suspension in sufficient quantity to provide a total binder solids content of from about 1 to 100 parts by weight for each 100 parts by weight of the mineral pigment. If the binder is an E/VCl/NMA terpolymer starch or protein mixture, the starch or casein can be first added to the E/VCl/NMA interpolymer latex, and the E/VCl/NMA terpolymer latex-starch or casein mixture added to the clay suspension to bring the binder solids content to the desired level in the coating composition. An alternate method is to add the starch or casein to the pigment slurry and mix well prior to the addition of the E/VCl/NMA terpolymer latex. This method is suitable for the preparation of stable coating compositions of low (25 to 40 percent) solids content. A technique used to prepare coating compositions of high solids (60 to 75 percent) content comprises adding starch or casein to the E/VCl/NMA latex, adding the dry pigment thereto and mixing.

In addition to the water, pigment and E/VCl/NMA binder, coating compositions may contain certain minor ingredients added for a number of reasons. These materials include pine oil, sulfonated tall oil, defoamants, wax, viscosity stabilizers, shellac, dyestuffs, fungicides, slimicides, dispersants, coalescing aids, etc.

The pigment coating compositions are applied to the paper or paper board using any of the conventional methods well known to the art, such as a roll coater, blade coater, air knife or size press. The paper or paper board is generally coated with from about 5 pounds to about 25 pounds of pigment coating composition per side per ream (3,300 square feet) on a dry basis. The amount of coating will vary depending upon the substrate being coated and the end use thereof. The coated paper or paper board products of this invention comprise a base sheet and a coating adhered to at least one surface of the base sheet, the coating comprising a mineral or inorganic pigment and a plasticized E/VCl/NMA terpolymer pigment binder. The finished coating can contain from about 1 to about 100 parts by weight of E/VCl/NMA terpolymer binder for each 100 parts of a pigment.

The embodiments of this invention in which a particular property or privilege is claimed are defined as follows:

1. Aqueous composition comprising a mineral pigment and from about 1 to about 100 parts by weight, per 100 parts by weight of pigment, of an ethylene/vinyl chloride/N-methylol acrylamide terpolymer binder containing from about 15 to about 70 weight percent ethylene, from about 30 to about 85 weight percent vinyl chloride and from about 0.1 to about 10 weight percent N-methylol acrylamide wherein said aqueous composition contains from about 20 to about 400 parts by weight of pigment and terpolymer solids for each 100 parts by weight of water.

2. Composition of claim 1 wherein the terpolymer contains from about 20 to about 40 weight percent ethylene, from about 60 to about 80 weight percent vinyl chloride, and from about 1.5 to about 4 weight percent N-methylol acrylamide.

3. Composition of claim 1 wherein the pigment is clay.

4. Composition of claim 1 wherein the terpolymer is present in an amount from about 10 to about 25 parts by weight for each 100 parts by weight of pigment.

5. Cellulosic substrate having on at least one surface thereof a dried coating comprising a pigment and from about 1 to about 100 parts by weight, per each 100 parts by weight of pigment, of an ethylene/vinyl chloride/N-methylol acrylamide terpolymer binder containing from about 15 to about 70 weight percent ethylene, from about 30 to about 85 weight percent vinyl chloride, and from about 0.1 to about 10 weight percent N-methylol acrylamide.

6. Substrate of claim 5 wherein the terpolymer contains from about 20 to about 40 weight percent ethylene, from about 60 to about 80 weight percent vinyl chloride and from about 1.5 to about 4 weight percent N-methylol acrylamide.

7. Substrate of claim 5 wherein the pigment is clay and the terpolymer is present in an amount from about 10 to about 25 parts by weight for each 100 parts by weight of pigment.

8. Substrate of claim 5 which is paper.

9. Substrate of claim 5 wherein the pigment is clay, the substrate is paper, the terpolymer is present in an amount from about 10 to about 25 parts by weight for each 100 parts by weight of pigment and the terpolymer contains from about 20 to about 40 weight percent ethylene, from about 60 to about 80 weight percent vinyl chloride, and from about 1.5 to about 4 weight percent N-methylol acrylamide.

* * * * *